US009658389B2

(12) United States Patent
Jeoung et al.

(10) Patent No.: US 9,658,389 B2
(45) Date of Patent: May 23, 2017

(54) BACKLIGHT UNIT AND LIQUID CRYSTAL DISPLAY DEVICE INCLUDING THE SAME

(71) Applicant: LG DISPLAY CO., LTD., Seoul (KR)

(72) Inventors: Do-Young Jeoung, Paju-si (KR); Chang-Il Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/955,493

(22) Filed: Dec. 1, 2015

(65) Prior Publication Data

US 2016/0161667 A1    Jun. 9, 2016

(30) Foreign Application Priority Data

Dec. 3, 2014 (KR) .......................... 10-2014-0172355

(51) Int. Cl.
*G02F 1/1333* (2006.01)
*F21V 8/00* (2006.01)

(52) U.S. Cl.
CPC .......... *G02B 6/0088* (2013.01); *G02B 6/0055* (2013.01)

(58) Field of Classification Search
CPC ............ G02F 1/133308; G02B 6/0088; G02B 6/0055
See application file for complete search history.

(56) References Cited

U.S. PATENT DOCUMENTS

2013/0155346 A1* 6/2013 Li ..................... G02F 1/133308
349/58

* cited by examiner

*Primary Examiner* — James Dudek
(74) *Attorney, Agent, or Firm* — Dentons US LLP

(57) ABSTRACT

Disclosed is a backlight unit and LCD device having a fixing device attached to a bottom cover and a guide panel to prevent the guide panel from shifting and detaching from the bottom cover. The backlight unit comprises a bottom cover having a bottom portion including a first hole, and a side portion having a second hole; a light guide plate on the bottom portion of the bottom cover; at least one optical sheet on the light guide plate; a guide panel adjacent the guide plate and the optical sheet; and a fixing device. The fixing device includes a horizontal portion; and a side portion extending perpendicularly from the horizontal portion. The side portion includes second protrusion portions extending inward from an edge of the side portion and parallel to the horizontal portion, and supporting portions extending vertically from the side portion at distal ends of the side portion.

20 Claims, 3 Drawing Sheets

BACKLIGHT UNIT AND LIQUID CRYSTAL DISPLAY DEVICE INCLUDING THE SAME

The present application claims the priority benefit of Korean Patent Application No. 10-2014-0172355 filed in Republic of Korea on Dec. 3, 2014, which is hereby incorporated by reference in its entirety for all purposes as if fully set forth herein.

BACKGROUND OF THE INVENTION

Field of the Disclosure

The present invention relates to a backlight unit and a liquid crystal display device (LCD) including the same. More particularly, the invention relates to a backlight unit and an LCD that fixes a bottom cover and a guide panel to prevent the guide panel from detaching outwards from the bottom cover.

Discussion of the Related Art

Generally, an LCD device displays images by adjusting light transmittance of liquid crystal using an electric field.

FIG. 1 is a cross-sectional view illustrating a non-light entering portion of a backlight unit of an LCD according to the related art.

Referring to FIG. 1, the LCD includes a liquid crystal panel 80, at least one optical sheet 45, a light guide plate 50, a reflection sheet 60, a bottom cover 30 and a guide panel 40.

In more detail, the liquid crystal panel 80 includes a thin film transistor (TFT) substrate, a color filter substrate, and a liquid crystal layer between the TFT substrate and the color filter substrate.

Polarization plates may be attached to bottom and top surfaces of the liquid crystal panel 80, respectively.

The light guide plate 50 functions to transmits light from a light source toward the liquid crystal panel 80, and is formed of plastic material such as PMMA (poly methyl methacrylate), or glass material.

The at least one optical sheet 45 is disposed on the light guide plate 50, and diffuses and concentrates light passing through the light guide plate 50 and supplies the light to the liquid crystal panel 80.

The reflection sheet 60 is disposed below the light guide plate 50, and reflects the light leaked from the light guide plate 50 back in the direction of the liquid crystal panel 80.

The bottom cover 30 has an accommodating space therein to accommodate the reflection sheet 60, the light guide plate 50 and the optical sheet 45.

A hook 30a is formed at a side surface of the bottom cover 30. The hook 30a protrudes outward through a Hemming process.

The guide panel 40 is adjacent to the light guide plate 50 and the optical sheet 45. The guide panel 40 includes a side surface portion that surrounds an outer surface of the bottom cover 30, and a supporting portion that extends from the side surface portion toward the light guide plate 50 and the optical sheet 45 and supports the light guide plate 50 and the optical sheet 45.

At least one first hole hl1 is formed at the side surface portion of the guide panel 40 and is coupled to the corresponding hook 30a.

Through the coupling of the hook 30a in the bottom cover 30 and the first hole hl1 of the guide panel 40, the bottom cover 30 and the guide panel 40 are fixed to each other.

A binding force between the hook 30a and the first hole hl1 is weak. Thus, the hook 30a and the hole hl1 can be easily separated.

Further, a second hole hl2 is formed at a bottom surface of the supporting portion of the guide panel 40. Through the coupling of the second hole hl2 to an end of the side surface of the bottom cover 30, the hook 30a and the hole hl1 of the guide panel 40 can be separated. Thus, the guide panel 40 is shifted and the guide panel 40 will be separated from the end portion of the side surface of the bottom cover 30.

Further, the bottom surface of the supporting portion of the guide panel 40 contacts the optical sheet 45, and the liquid crystal panel 80 may be placed on a top surface of the supporting portion of the guide panel 40.

The top surface of the supporting portion of the guide panel 40 and the liquid crystal panel 80 may be fixed to each other using, for example, a double-sided adhesive tape.

Recently, along with lightweight and thin profile, the LCD is required to have a narrow bezel and a thin backlight unit to realize slim design of a final product such as for a TV or monitor. The bezel is defined as a width of a non-display region outside a display region.

In the related art LCD, to reduce the bezel, a first thickness d1 of the side surface portion of the guide panel 40 is required to be small, and also, a second thickness d2 of the supporting portion of the guide panel 40 is required to be small.

Accordingly, a depth d3 of the second hole hl2 is required to be small.

Accordingly, an extent to which the end of the side surface of the bottom cover 30 is positioned in the second hole hl2 is reduced. Thus the hook 30a of the bottom cover 30 and the first hole hl1 of the guide panel 40 are separated, and the guide panel 40 is bent outwards from the bottom cover. Therefore, a defect of the backlight unit is caused.

SUMMARY

Accordingly, the present invention is directed to an backlight unit and an LCD that substantially obviates one or more problems due to limitations and disadvantages of the related prior art by securing a bottom cover and a guide panel using a fixing means. Thus, preventing the guide panel from shifting outwards and detaching from the bottom cover.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims as well as the appended drawings.

To achieve these and other advantages, and in accordance with the purpose of the present invention, as embodied and broadly described herein, disclosed is a backlight unit and liquid crystal display device having a fixing device attached to a bottom cover and a guide panel to prevent the guide panel from shifting and detaching from the bottom cover. The backlight unit, comprises: a bottom cover having a bottom portion including a first hole, and a side portion having a second hole; a light guide plate on the bottom portion of the bottom cover; at least one optical sheet on the light guide plate; a reflection sheet below the light guide plate; a guide panel adjacent to the guide plate and the at least one optical sheet; and a fixing device, wherein the fixing device includes: a horizontal portion; and a side portion extending perpendicularly from the horizontal portion, the side portion including second protrusion portions extending inward from an edge of the side portion and parallel to the horizontal portion, and supporting portions extending vertically from the side portion at distal ends of the side portion.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE PREFERRED EMBODIMENTS

Reference will now be made in detail to exemplary embodiments, examples of which are illustrated in the accompanying drawings.

Figure 1:
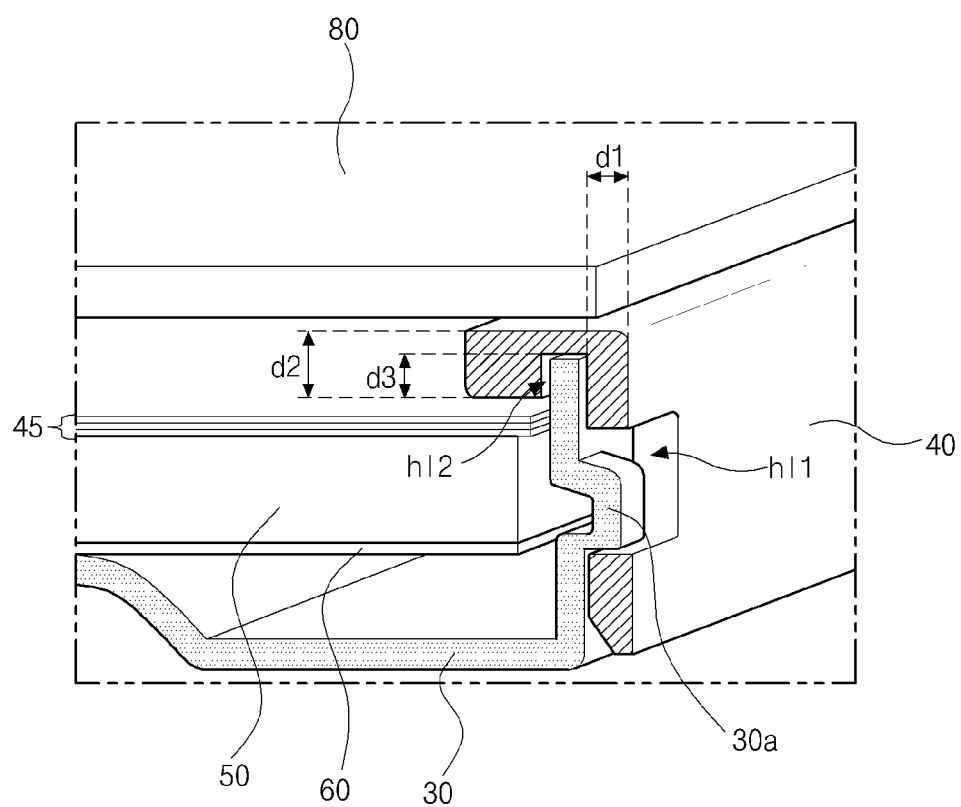
FIG. 1 is a cross-sectional view illustrating a non-light entering portion of a backlight unit of an LCD according to the related art.
Figure 2:
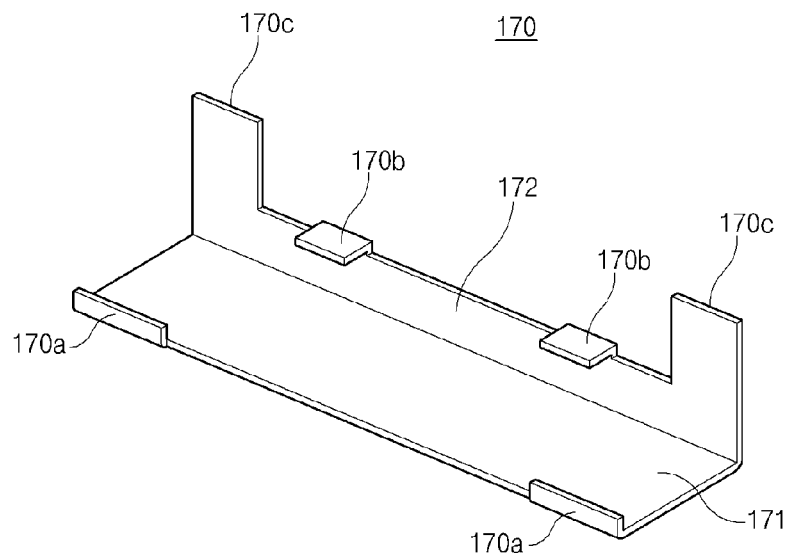
FIG. 2 is a perspective view illustrating a fixing means of an LCD according to an embodiment of the present invention.

FIG. 2 is a perspective view illustrating a fixing means of an LCD according to an embodiment of the present invention.

Referring to FIG. 2, the fixing means 170 includes a horizontal portion 171 and a second side portion 172 extending perpendicularly from the horizontal portion 171.

The horizontal portion 171 may include a first protrusion portion 170a protruding upwards from an edge thereof. The second side portion 172 may include a second protrusion portion 170b inwards from the second side portion 172, and a supporting portion 170c vertically extending therefrom.

For the purpose of explanation, in the drawings, two first protrusion portions 170a, two second protrusion portions 170b and two supporting portions 170c are shown. However, a number of each of these components may be one, two, three, or more than three, and portions of the components may be adjusted depending on the size and thickness of a backlight unit.

When a number of each of the above components is two, it is preferred, but not limited, that the two first protrusion portions 170a are located at both sides of the horizontal portion 171, respectively, the two supporting portions 170c are extended from both side ends of the second side portion 172, respectively, and the two second protrusion portions 170b are located between the two supporting portions 170c.

By this configuration, a guide panel 140 being shifted and detached from the bottom cover 130 can be prevented.

Further, since the supporting portion 170c is used to prevent the guide panel 140 from being detached, the supporting portion 170c may extend within a length of a first side portion 133 of the guide panel 140, and preferably, the supporting portion 170c has substantially the same length as the first side portion 133 of the guide panel 140.

Further, the fixing means 170 is formed of a metal material having a high rigidity, such as aluminum (Al), rather than a plastic material. Accordingly, the guide panel can be effectively prevented from bending.

Figure 3:
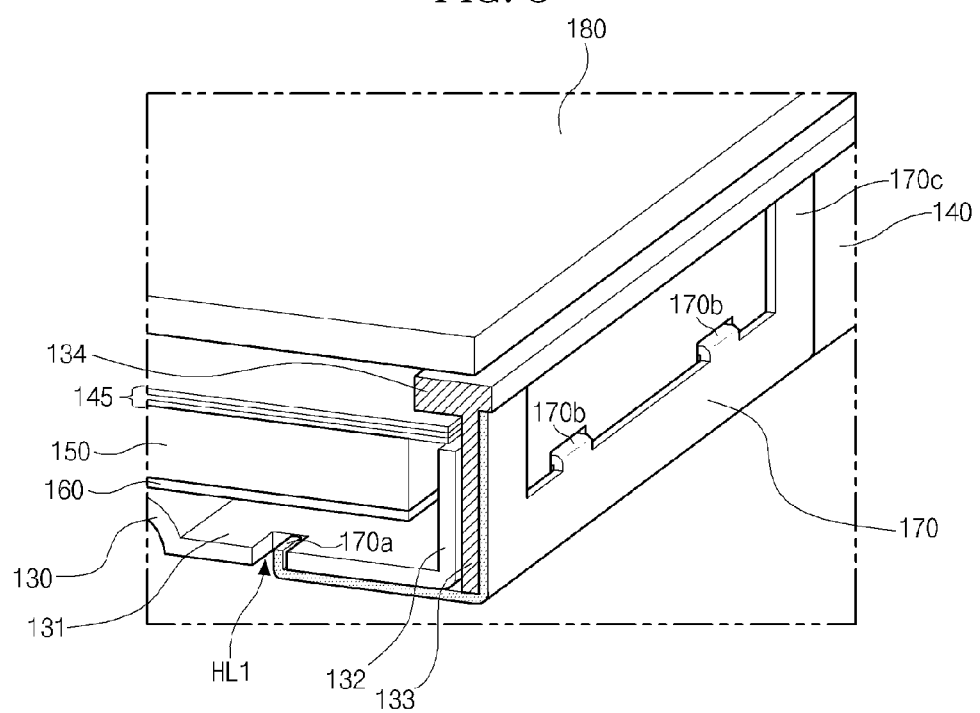
FIGS. 3 and 4 are cross-sectional views illustrating an LCD including a fixing means according to the embodiment of the present invention.
Figure 4:
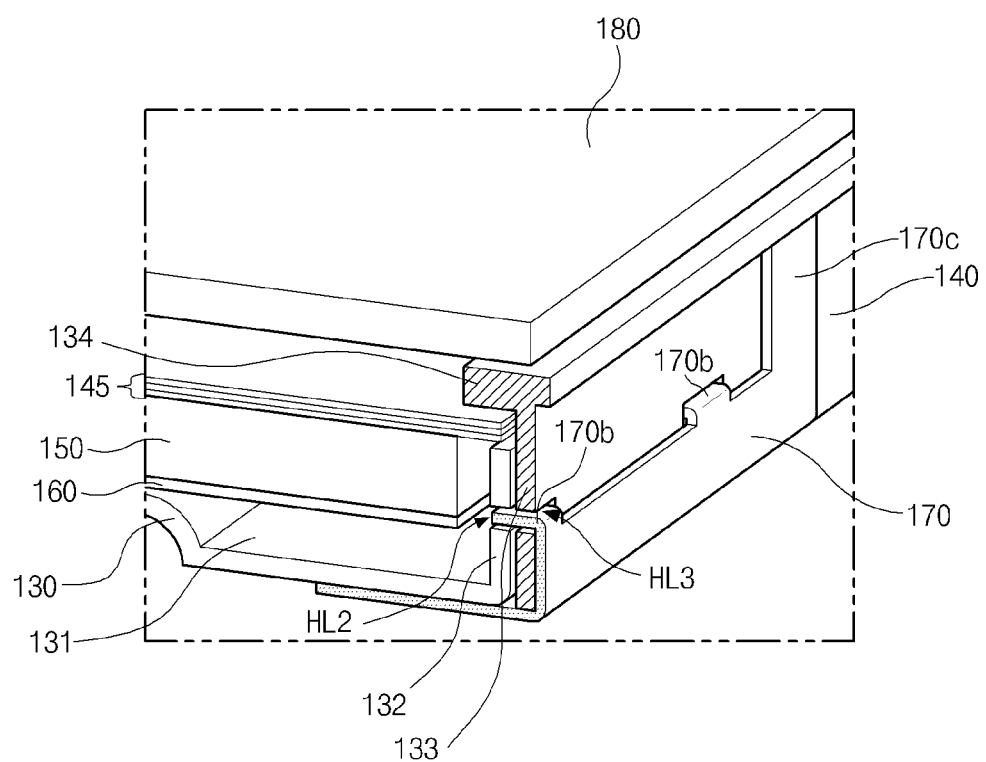

FIGS. 3 and 4 are cross-sectional views illustrating an LCD including a fixing means according to an embodiment of the present invention.

In more detail, FIG. 3 shows a first hole HL1 in a bottom cover 130 and a first protrusion portion 170a of a fixing means 170 that are coupled to each other, and FIG. 4 shows a second hole HL2 in the bottom cover 130, a third hole HL3 in a guide panel 140, and a second protrusion portion 170b of the fixing means 170 that are coupled to one another.

Referring to FIGS. 3 and 4, a backlight unit includes a bottom cover 130, at least one optical sheet 145, a light guide plate 150, a reflection sheet 160, a guide panel 140 and a fixing means 170.

The light guide plate 150 functions to transmit light emitted from a light source (not shown) toward a liquid crystal panel 180, and may be formed of a plastic material, for example, PMMA (poly methyl methacrylate), or a glass material.

The at least one optical sheet 145 is disposed on the light guide plate 150, and diffuses and concentrates light passing through the light guide plate 150 and supplies the light to the liquid crystal panel 180.

The reflection sheet 160 is disposed below the light guide plate 150, and reflects the light leaked from the light guide plate 150 back towards the liquid crystal panel 180.

The bottom cover 130 includes a bottom portion 131 having a first hole HL1 and a side portion 132 having a second hole HL2 (FIG. 4) and has an accommodating space therein. The reflection sheet 160, the light guide plate 150 and the optical sheet 145 are placed on the bottom portion 131 of the bottom cover 130.

Even though not shown in the drawings, at least one hook may be formed at the bottom cover 130 and protrude outwards through a Hemming process.

The guide panel 140 includes a first side portion 133, and a first supporting portion 134 extending from the first side portion 133 toward the light guide plate 150. The first side portion 133 contacts a side portion 132 of the bottom cover 130, and may include a third hole HL3 (FIG. 4) that is formed at the same position as the second hole HL2 in the side portion 132 of the bottom cover 130.

The first supporting portion 134 of the guide panel 140 functions to fix the optical sheet 145.

Even though not shown in the drawings, the first side portion 133 of the guide panel 140 may include at least one hole coupled to the corresponding hook of the bottom cover 130.

As described in the related art, through the coupling of a hook of the bottom cover 130 and the hole of the guide panel 140, the bottom cover 130 and the guide panel 140 can be fixed to each other.

However, since the coupling force between the hook of the bottom cover 130 and the hole of the guide panel 140 of the related art is weak, the hook and the hole can be separated by a small external force.

The fixing means 170 of the present disclosure includes a horizontal portion 171 and a second side portion 172. The horizontal portion 171 contacts a lower surface of the bottom portion 131 of the bottom cover 130, and the second side portion 172 extends perpendicularly from the horizontal portion 171 and contacts the first side portion 133 of the guide panel 140.

The horizontal portion 171 of the fixing means 170 includes a first protrusion portion 170a coupled to the bottom cover 130 via the first hole HL1. The second side portion 172 of the fixing means 170 includes a second protrusion portion 170b coupled to the guide panel 140 and the bottom cover 130 via the second and third holes HL2 and HL3, and a supporting portion 170c vertically extending from the second side portion 172.

Accordingly, the guide panel 140 being bent outwards due to a hook of the bottom cover 130, and the corresponding holes of the guide panel 140 being separated from each other can be prevented.

For the purpose of explanation, in the drawings, two first protrusion portions 170a, two second protrusion portions 170b and two supporting portions 170c are shown. However, a number of each of these components may be one, two, three, or more than three, and portions of the components may be adjusted depending on size and thickness of the backlight unit.

Further, since the first protrusion portion 170a is coupled to the first hole HL1 and second protrusion portion 170b is coupled to the second and third holes HL2 and HL3, a number of the first protrusion portions 170a is equal to a number of the first holes HL1, and a number of the second protrusion portions 170b is equal to a number of the second holes HL2 and a number of the third holes HL3.

Further, in a case that a length of the first protrusion portion 170a is greater than a depth of the first hole HL1 and thus the first protrusion portion 170a protrudes over the bottom portion 131 of the bottom cover 130, this causes interference to the light guide plate 150 and the reflection sheet 160 placed on the bottom portion 131 of the bottom cover 130. Thus, causing decreased display quality. Accordingly, it is preferred that the length of the first protrusion portion 170a is equal to or less than a depth of the first hole HL1.

Further, as shown in the drawings, when two first protrusion portions 170a, two second protrusion portions 170b, and two supporting portions 170c are formed, it is preferred that the two first protrusion portions 170a are located at both sides of the horizontal portion 171, respectively, the two supporting portions 170c are extended from both side ends of the second side portion 172, respectively, and the two second protrusion portions 170b are located between the two supporting portions 170c.

By this configuration, the guide panel 140 being bent due to a hook of the bottom cover 130 and the corresponding holes of the guide panel 140 being separated from each other can be effectively prevented.

Further, the fixing means 170 is formed of a metal material having a high rigidity, such as aluminum (Al), rather than a plastic material. Accordingly, the guide panel 140 can be effectively prevented from shifting and detaching from the bottom cover.

Further, since the supporting portion 170c is used to prevent the guide panel 140 from shifting, it is preferred that the supporting portion 170c extend up to a potential bending position between the first side portion 133 and the first supporting portion 134 of the guide panel 140.

The backlight unit has four side portions corresponding to four side surfaces of the light guide plate 150. The four side surfaces of the light guide plate 150 have one light entering surface and three non-light entering surfaces. Also, the four side portions of the backlight unit are defined as one light entering side portion corresponding to the light entering surface and three non-light entering side portion corresponding to the three non-light entering surfaces. The fixing means 170 may be arranged to correspond to each of the three non-light entering portions of the backlight unit except for the light entering portion, and further, at least one fixing means 170 may be coupled to each of the three non-light entering portions.

In this case, since a printed circuit board for a light source is arranged at the light entering portion, the second hole HL2 of the bottom cover 130 to be coupled to the second protrusion portion 170b of the fixing means 170 would not be formed at the light entering portion, and thus the fixing means 170 would not be coupled to the light entering portion.

For example, assuming that the light entering portion is located at a bottom surface of a backlight unit, since one non-light portion at a top surface opposite to the light entering portion generally has a length greater than a length of two non-light entering portions at both side surfaces, it is preferred, but not limited, that three fixing means 170 are arranged at the top surface and two fixing means 170 are arranged at each of the both side surfaces.

By this configuration, the guide panel 140 being shifted and detached can be effectively prevented.

A method of coupling the fixing means 170 to the bottom cover 130 and the guide panel 140 is explained below.

The reflection sheet 160, the light guide plate 150 and the optical sheet 145 are placed in the accommodating space of the bottom cover 130, and the guide panel 140 is coupled to the side portion 132 of the bottom cover 130.

A part of the optical sheet 145 is located below the first supporting portion 134 of the guide panel 140 so that the guide panel 140 fixes the optical sheet 145.

The first protrusion portion 170a of the fixing means 170 is coupled to the first hole HL1 of the bottom portion 131 of the bottom cover 130. Then, the fixing means 170 is rotated in a direction to the guide panel 140 and thus the second protrusion portion 170b is coupled to the second hole HL2 of the side portion 132 of the bottom cover 130 and the third hole HL3 of the first side portion 133 of the guide panel 140.

Accordingly, the fixing means 170 can be easily coupled to the bottom cover 130 and the guide panel 140.

As described above, in the backlight unit according to the embodiment, the first side portion 133 and the first supporting portion 134 of the guide panel 140 each can have a small thickness. Thus, a bezel of a non-display region can be small, and a thickness of the backlight unit can be also small.

Further, even though the first side portion 133 and the first supporting portion 134 of the guide panel 140 each have a small thickness, the guide panel 140 being shifted and the corresponding holes of the guide panel 140 being separated from the bottom cover can be effectively prevented, and thus a solid backlight unit can be manufactured.

An LCD can be manufactured by arranging the liquid crystal panel 180 on the above backlight unit.

In more detail, the liquid crystal panel 180 is placed on the first supporting portion 134 of the guide panel 140 and may be fixed to the guide panel 140 using a double-sided adhesive tape.

The liquid crystal panel 180 includes a thin film transistor (TFT) substrate, a color filter substrate, and a liquid crystal layer between the TFT substrate and the color filter substrate.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed:
1. A backlight unit, comprising:
a bottom cover having a bottom portion including a first hole, and a side portion having a second hole;

a light guide plate on the bottom portion of the bottom cover;

at least one optical sheet on the light guide plate;

a reflection sheet below the light guide plate;

a guide panel adjacent to the light guide plate and the at least one optical sheet; and a fixing device, wherein the fixing device includes:

a horizontal portion including a first protrusion portion protruding substantially perpendicularly from an edge of the horizontal portion; and a side portion extending perpendicularly from the horizontal portion, the side portion including second protrusion portions extending inward from an edge of the side portion and parallel to the horizontal portion, and supporting portions extending further vertically from the side portion at distal ends of the side portion, wherein the first protrusion portion couples the horizontal portion of the fixing device to the bottom cover via the first hole.

2. The backlight unit of claim 1, wherein the reflection sheet, the light guide plate and the at least one optical sheet are located in an accommodating space of the bottom cover.

3. The backlight unit of claim 1, wherein the guide panel comprises: a first side portion, and a first supporting portion extending from the first side portion toward the light guide plate.

4. The backlight unit of claim 3, wherein the first side portion contacts a side of the bottom cover and an upper surface of the at least one optical sheet.

5. The backlight unit of claim 4, wherein the first side portion includes a third hole.

6. The backlight unit of claim 1, wherein the horizontal portion of the fixing device contacts a lower surface of the bottom cover.

7. The backlight unit of claim 3, wherein the side portion of the fixing device contacts the first side portion of the guide panel.

8. The backlight unit of claim 1, wherein the second protrusion portions of the fixing device are coupled to the guide panel via the third hole.

9. The backlight unit of claim 1, wherein the second protrusion portions are located between the supporting portions located at the distal ends of the side portion.

10. The backlight unit of claim 5, wherein the second protrusion portions of the fixing device are coupled to the guide panel and the bottom cover via the second and third holes.

11. The backlight unit of claim 1, wherein the horizontal portion and side portion of the fixing device correspond to non-light entering sides of the backlight unit.

12. The backlight unit of claim 1, wherein the reflection sheet reflects light from the light guide plate in a direction of the at least one optical sheet.

13. The backlight unit of claim 1, wherein a length of the first protrusion is equal to or less than a depth of the first hole in the bottom cover.

14. The backlight unit of claim 1, wherein the side portion of the fixing device is opposite the first protrusion portion.

15. A fixing device for attaching a backlight unit and a liquid crystal display panel, comprising:

a horizontal portion including a first protrusion portion protruding substantially perpendicularly from an edge of the horizontal portion; and a side portion extending perpendicularly from the horizontal portion, the side portion including second protrusion portions extending inward from an edge of the side portion and parallel to the horizontal portion, and supporting portions extending further vertically from the side portion at distal ends of the side portion, wherein the first protrusion portion couples the horizontal portion of the fixing device to the bottom cover via the first hole.

16. The fixing device of claim 15, wherein the side portion is opposite the first protrusion portion.

17. The fixing device of claim 15, wherein the second protrusion portions are located between the supporting portions.

18. The fixing device of claim 15, wherein the supporting portions extend vertically to a length of a first side portion of a guide panel.

19. The fixing device of claim 15, wherein a length of the first protrusion is greater than a depth of a first hole in a bottom cover of the backlight unit.

20. A liquid crystal display device, comprising:

a liquid crystal panel having a thin film transistor substrate and color filter substrate coupled to each other and a liquid crystal layer therebetween; and a backlight unit, wherein the liquid crystal panel is on an upper surface of the backlight unit, the backlight unit comprising:

a bottom cover having a bottom portion including a first hole, and a side portion having a second hole;

a light guide plate on the bottom portion of the bottom cover;

at least one optical sheet on the light guide plate;

a reflection sheet below the light guide plate;

a guide panel adjacent to the light guide plate and the at least one optical sheet; and a fixing device, wherein the fixing device includes:

a horizontal portion including a first protrusion portion protruding substantially perpendicularly from an edge of the horizontal portion; and a side portion extending perpendicularly from the horizontal portion, the side portion including second protrusion portions extending inward from an edge of the side portion and parallel to the horizontal portion, and supporting portions extending further vertically from the side portion at distal ends of the side portion, wherein the first protrusion portion couples the horizontal portion of the fixing device to the bottom cover via the first hole.

* * * * *